United States Patent
Jarman et al.

(10) Patent No.: US 9,762,963 B2
(45) Date of Patent: *Sep. 12, 2017

(54) METHOD AND APPARATUS FOR CONTROLLING PLAY OF AN AUDIO SIGNAL

(71) Applicant: ClearPlay, Inc., Salt Lake City, UT (US)

(72) Inventors: Matthew T. Jarman, Salt Lake City, UT (US); William S. Meisel, Tarzana, CA (US)

(73) Assignee: ClearPlay, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,269

(22) Filed: Jun. 12, 2015

(65) Prior Publication Data

US 2016/0029084 A1    Jan. 28, 2016

Related U.S. Application Data

(63) Continuation of application No. 12/426,693, filed on Apr. 20, 2009, now Pat. No. 9,066,046, which is a continuation of application No. 10/927,769, filed on Aug. 26, 2004, now abandoned.

(60) Provisional application No. 60/497,769, filed on Aug. 26, 2003.

(51) Int. Cl.
| | |
|---|---|
| *G10L 15/00* | (2013.01) |
| *H04N 21/454* | (2011.01) |
| *H04H 60/13* | (2008.01) |
| *H04H 60/48* | (2008.01) |
| *H04N 5/445* | (2011.01) |
| *H04N 21/435* | (2011.01) |

(Continued)

(52) U.S. Cl.
CPC ........ *H04N 21/4542* (2013.01); *H04H 60/13* (2013.01); *H04H 60/48* (2013.01); *H04N 5/44513* (2013.01); *H04N 21/435* (2013.01); *H04N 21/4394* (2013.01); *H04N 21/4396* (2013.01); *H04N 21/440236* (2013.01); *H04N 21/4545* (2013.01); *H04N 21/4884* (2013.01)

(58) Field of Classification Search
USPC ... 704/254, 231, 9, 251, 260, 232, 243, 246; 348/468; 725/1, 131, 38; 715/716
See application file for complete search history.

(56) References Cited

U.S. PATENT DOCUMENTS

| | | | | |
|---|---|---|---|---|
| 4,703,504 A | * | 10/1987 | Vittorelli | ................. G10L 15/10 704/254 |
| 5,333,275 A | * | 7/1994 | Wheatley | ................. G10L 15/18 704/231 |

(Continued)

*Primary Examiner* — Neeraj Sharma
(74) *Attorney, Agent, or Firm* — Polsinelli PC

(57) ABSTRACT

Apparatus and methods conforming to the present invention comprise a method of controlling playback of an audio signal through analysis of a corresponding close caption signal in conjunction with analysis of the corresponding audio signal. Objection text or other specified text in the close caption signal is identified through comparison with user identified objectionable text. Upon identification of the objectionable text, the audio signal is analyzed to identify the audio portion corresponding to the objectionable text. Upon identification of the audio portion, the audio signal may be controlled to mute the audible objectionable text.

3 Claims, 8 Drawing Sheets

(51) Int. Cl.
*H04N 21/439* (2011.01)
*H04N 21/4402* (2011.01)
*H04N 21/4545* (2011.01)
*H04N 21/488* (2011.01)
*G06F 13/00* (2006.01)
*H04N 7/173* (2011.01)
*H04N 7/16* (2011.01)
*G10L 17/00* (2013.01)
*G10L 15/04* (2013.01)
*G06F 3/00* (2006.01)
*H04N 11/00* (2006.01)

(56) References Cited

U.S. PATENT DOCUMENTS

| | | | | |
|---|---|---|---|---|
| 5,774,859 A | * | 6/1998 | Houser | H04N 5/44543 348/E5.103 |
| 5,805,771 A | * | 9/1998 | Muthusamy | G10L 15/005 704/231 |
| 6,972,802 B2 | * | 12/2005 | Bray | H04N 5/44513 348/468 |
| 7,058,889 B2 | * | 6/2006 | Trovato | G10H 1/368 348/E5.002 |
| 2002/0052870 A1 | * | 5/2002 | Charlesworth | G06F 17/30017 |
| 2003/0093790 A1 | * | 5/2003 | Logan | G06F 17/30265 725/38 |
| 2003/0200217 A1 | * | 10/2003 | Ackerman | G06F 21/32 |
| 2003/0229494 A1 | * | 12/2003 | Rutten | G10L 13/06 704/254 |
| 2004/0073428 A1 | * | 4/2004 | Zlokarnik | G10L 13/033 704/260 |
| 2004/0128137 A1 | * | 7/2004 | Bush | G10L 15/26 704/275 |
| 2004/0267523 A1 | * | 12/2004 | Kim | G10L 25/69 704/205 |
| 2007/0033003 A1 | * | 2/2007 | Morris | G10L 15/04 704/9 |

* cited by examiner

| | Time (20 ms time intervals) —> | | | | | | | | | | | | | |
|---|---|---|---|---|---|---|---|---|---|---|---|---|---|---|
| Observed signal | x1 | x2 | x3 | x4 | x5 | x6 | x7 | x8 | x9 | x10 | x11 | x12 | x13 | x14 |
| Predicted signal | - | F | F | F | V | V | V | V | V | V | V | N | N | |

FIG. 8

METHOD AND APPARATUS FOR CONTROLLING PLAY OF AN AUDIO SIGNAL

CROSS-REFERENCE TO RELATED APPLICATIONS

This application is a continuation application of U.S. patent application Ser. No. 12/426,693, filed Apr. 20, 2009 and entitled "Method and Apparatus for Controlling Play of an Audio Signal," which is a continuation application of U.S. patent application Ser. No. 10/927,769, filed Aug. 26, 2004 and entitled "Method and Apparatus for Controlling Play of an Audio Signal," which claims the benefit of priority under 35 U.S.C. §119(e) to U.S. Provisional Patent Application No. 60/497,769, filed Aug. 26, 2003 and entitled "Filtering of Media Content Based on Analysis of the Associated Audio Signal; Using Associated Closed Captioning Signal to Aid in the Analysis." Each of these applications is hereby incorporated by reference herein in its entirety.

FIELD OF THE INVENTION

This invention relates generally to playing and audio/visual presentation and more particularly a method and apparatus for filtering objectionable words from and audio signal.

BACKGROUND

Live and taped television and radio programming, movies, and various audio presentations oftentimes include profanity, slurs, and other words or phrases that a particular person may find objectionable. In many instances, people actively avoid a presentation because of the presence of objectionable language. Moreover, it is often the case that parents seek to prohibit their children from being exposed to such language.

Products exist that can mute an entire phrase containing an objectionable word. However, muting an entire phrase often results in large incomplete sections of dialogue—resulting in poor viewer comprehension and increased viewer frustration. The overall result oftentimes degrades the quality of the audio presentation.

A typical television set, set-top box, or the like includes various processing elements to receive television signals, including both an audio component and video component, and to play the audio and display the video signals. However, the processing elements are dedicated to the processing of the audio/visual signals, and have little excess bandwidth to perform other operations.

Aspects of the present invention were conceived with this background in mind. The present invention involves an apparatus and method for controlling play of an audio signal, whether alone or forming a part of an audio/visual signal. Embodiments conforming to the present invention may be configured to mute only objectionable words from an audio stream. Further embodiments of the present invention may be adapted to run on conventional audio/visual processing equipment, such as television processors, set-top boxes, and the like, with little or no modification of existing physical platforms, and may be adapted to run in real time if necessary for the particular application. The details of embodiments of the present invention are discussed in more detail below.

SUMMARY

One aspect of the invention involves a method of controlling play of an audio signal comprising receiving a close caption signal and analyzing the close caption signal for a specified text. Upon identification of the specified text, analyzing an audio signal as a function of the identification of the specified text from the close caption signal. Playback of the audio signal corresponding to the specified text may then be controlled.

The operation of controlling playback may comprise (1) attenuating a portion of the audio signal corresponding with the specified text of the close caption signal; (2) substantially deleting the portion of the audio signal corresponding with the specified text of the close caption signal; (3) issuing at least one command adapted to cause attenuation of a portion of the audio signal corresponding with the specified text of the close caption signal; (4) and, inserting at least one control code in the audio signal, the control code adapted to cause attenuation of a portion of the audio signal corresponding with the specified text from the close caption signal.

The method may further comprise the operation of converting the specified text to a phonetic representation of the specified text. Further, the method may comprise time extending the phonetic representation of the specified text to define a time extended phonetic representation of the specified text. For the phonetic representation, at least one energy value may be determined to define a comparative form of the specified text. Similarly, the method may comprise determining at least one energy value for the audio signal to define a comparative form of the audio signal.

The operation of analyzing an audio signal may further comprise the operation of comparing the comparative form of the specified text with the comparative form of the audio signal. By which, the method may further comprise the operation of identifying the portion of the audio signal corresponding with the specified text.

The specified text may be a space, a letter, a word, a phrase, a sentence, a control code, and a symbol. Further, the specified text may be selected by a user. Finally, the specified text may be selected from a text considered objectionable.

In some particular implementations, the operation of identifying the specified text further comprises the operation of identifying a preceding text, the preceding text temporally preceding the specified text. The operation of analyzing an audio signal as a function of the identification of the specified text from the close caption signal may then further comprise analyzing the audio signal as function of the identification of the preceding text from the close caption signal. Further, the operation of controlling playback of the audio signal corresponding to the specified text may then further comprise controlling playback of the audio signal corresponding to the preceding text.

Another aspect of the invention involves a method of controlling play of an audio signal comprising: converting a specified portion of a close caption text signal to an audio equivalent of the specified portion; comparing the audio equivalent of the specified portion of the close caption text signal to an audio signal to identify a portion of the audio signal corresponding with the specified portion of the close caption signal; and controlling playback of the portion of the audio signal corresponding with the specified portion of the close caption signal.

The operation of controlling playback may further comprise (1) attenuating the portion of the audio signal corresponding with the specified portion of the close caption signal; (2) substantially deleting the portion of the audio signal corresponding with the specified portion of the close caption signal; (3) issuing at least one command adapted to cause attenuation of the portion of the audio signal corresponding with the specified portion of the close caption signal; (4) and, inserting at least one control code in the audio signal, the control code adapted to cause attenuation of the audio signal corresponding with the specified portion of the close caption signal.

The second method may include the operation of converting the specified portion of the close caption signal to a phonetic representation of the specified portion of the close caption signal. Additionally, the method may include the operation of time extending the phonetic representation of the specified portion of the close caption signal to define a time extended phonetic representation. For the phonetic representation, including the time extended version, the method may comprise determining at least one energy value for the phonetic representation to define a comparative form of the specified portion of the close caption signal.

For comparison, the second method may comprise determining at least one energy value for the audio signal to define a comparative form of the audio signal. As such, the operation of comparing may further comprise the operation of comparing the comparative form of the specified portion of the close caption signal with the comparative form of the audio signal. Further, the operation of comparing may further comprise identifying the portion of the audio signal corresponding with the specified portion of the close caption signal.

As with any methods discussed herein, a processor comprising a plurality of computer executable instructions may be configured to perform the various methods.

A third aspect of the invention involves a method of controlling playback of an audio signal comprising: receiving an indication of at least one objectionable word; identifying the at least one objectionable word in a close caption signal; and identifying the at least one objectionable word in an audio signal as a function of the operation of identifying the at least one objectionable word in a close caption signal.

Via the third method, or other methods, it is possible to control an audio presentation of the audio signal as a function of the operation of identifying.

The third method may further comprise muting the audio presentation of a portion of the audio signal corresponding with the at least one objectionable word. Additionally, the third method may involve identifying a portion of the close caption signal preceding the objectionable word. The preceding portion may be selected from the group comprising a space, a letter, a word, a phrase, a symbol, and a close caption control signal.

The third method may comprise identifying the at least one objectionable word in an audio signal as a function of the operation of identifying the at least one objectionable word in a close caption signal and the operation of identifying a portion of the close caption signal preceding the objectionable word. The operation of controlling is a function of the identification of a portion of the close caption signal preceding the objectionable word. The method may additionally include the operation of causing a mute of the audio presentation as a function of the identification of the portion of the close caption signal preceding the objectionable word in the audio stream. Also, the method may comprise ending the mute as a function of the identification of the at least one objectionable word in the audio signal.

A fourth aspect of the invention involves a method of controlling playback of an audio presentation comprising: receiving an indication of at least one objectionable word; receiving an audio signal; storing the audio signal in a memory; processing the stored audio signal to determine whether the at least one objectionable word is present in the audio signal; and controlling an audio presentation of the audio signal as a function of the operation of processing. The operation of controlling may comprise: (1) attenuating the portion of the audio signal corresponding with the at least one objectionable word; (2) substantially deleting the portion of the audio signal corresponding with the at least one objectionable word; (3) inserting at least one control code in the audio signal, the control code adapted to cause attenuation of the audio signal corresponding with the at least one objectionable word. Additionally, the operation of processing may include analyzing at least one channel of the audio signal.

BRIEF DESCRIPTION OF THE DRAWINGS

FIG. 8 is a graphical depiction of a time alignment and scoring routine to align and compare a comparative form of the text of the close caption signal to a comparative form of the audio signal conforming to the present invention.

DETAILED DESCRIPTION

Aspects of the present invention involve a television receiver, cable or satellite set-top box, video cassette recorder, DVD player, or other such audio signal processing apparatus configured to receive or otherwise process an audio stream. In one particular implementation, the audio signal processing apparatus is configured to mute certain words, such as words considered objectionable to a particular listener/viewer, within the audio stream. An apparatus or method conforming to the present invention may provide a mechanism whereby a user may indicate various words as objectionable. One embodiment conforming to the present invention analyzes the close caption stream to detect the objectionable word or phrase, converts the close caption word to an audio representation, and then compares the audio representation of the close caption to the audio stream to identify the objectionable word in the audio stream. When the objectionable word is identified, embodiments of the invention mute the audio presentation of the objectionable word.

FIGS. 1-8 and the following discussion are intended to provide a brief, general description of one suitable computing or signal processing environment in which embodiments of the invention may be implemented. Although not required, embodiments of the invention are described in the general context of computer-executable instructions, such as program modules being executed by one or more processing elements, such as a television processor. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps. Furthermore, program code means being executed by a processing unit provides one example of a processor means.

Figure 1:
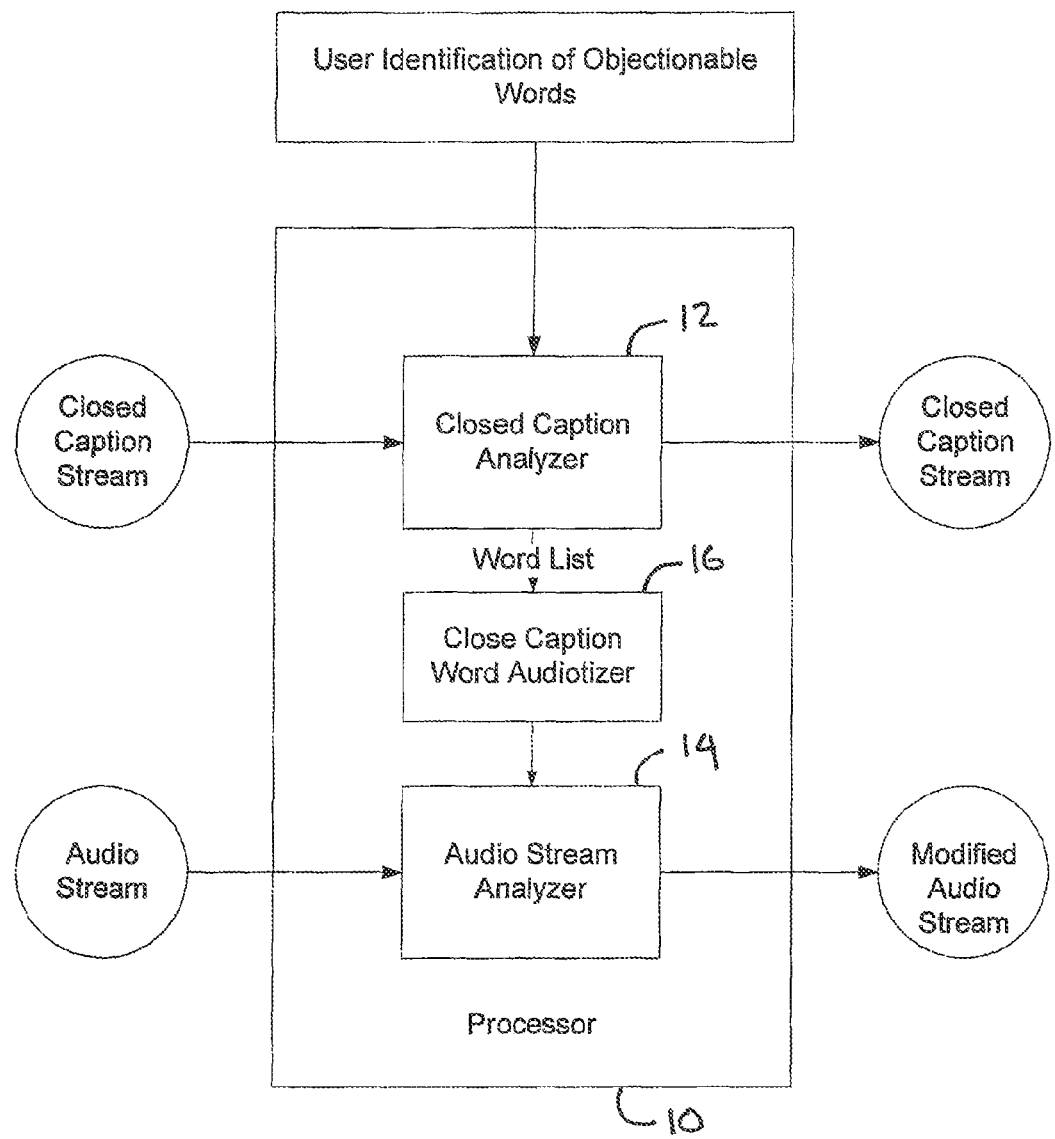
FIG. 1 is a block diagram illustrating one processing arrangement conforming to the present invention.

FIG. 1 is a block diagram illustrating one particular implementation of a processor platform 10 conforming to the present invention. The processor platform implements a closed caption analyzer 12 and an audio stream analyzer 14. The closed caption analyzer is configured to receive and process a closed caption stream from a conventional audio/video television signal. As used herein "close caption" refers to a signal defining a textual representation of an audio signal. The audio signal may be analog or digital, may be encoded, and may accompany a video signal. The close caption may comprise letters, spaces, words, phrases, and symbols. In a digital environment, the close captioning may further include data packets, network commands and links, and other data. In one particular example, close caption refers to a signal conforming to the EIA-608 or, EIA-708B, or related close caption standards. Close captioning may be provided in analog or digital television broadcast transmissions, cable, satellite transmission, as well as transmitted from stored media sources, such as DVDs and the like, in coordination with a stored audio signal. Typically, for analog television signals, the closed caption stream is present in the line 21 data area found in the vertical blanking interval ("VBI") of the television signal. The processor platform 10 includes a conventional close caption decoder. The close caption analyzer is configured to receive the decoded close caption signal. However, the close caption analyzer may be configured with a decoder. For digital television signals, close captioning is not provided in a VBI, as digital television signals do not have a VBI. Rather, the close captioning signal is multiplexed with the encoded digital television signal. For digital television signals the close captioning may be extracted by a digital television receiver platform.

The closed caption analyzer is also configured to receive a list of objectionable words identified by a particular user. The user may select the objectionable words through an onscreen selection process by which the user selects various objectionable words from a list of all possible objectionable words. In a television-based embodiment, onscreen menus with lists of objectionable words may be provided that users manipulate and select particular objectionable words through a remote control for the television, set-top box, receiver, etc., configured in accordance with the present invention. Alternatively the user may directly input objectionable words by way of a keyboard or some other text input device like the arrow keys on a remote control used in conjunction with an onscreen display of the alphabet.

Besides "objectionable words", embodiments of the invention may be configured to detect and control playback of any text. The closed caption analyzer 12 compares each word in the closed caption stream to the list of objectionable words identified by the user. Upon identification of a match between the closed caption stream words and the objectionable words, an objectionable word list is transferred to the audio stream analyzer 14.

The objectionable word list, depending on a particular implementation of the present invention, may include only the identified objectionable text, the objectionable text and the preceding text, or the entire close caption stream with the objectionable text and predecessor text flagged. As used herein, the term "text" refers to any component of a close caption stream, such as letters, words, spaces, phrases, symbols, and control codes. The word list is passed to a close caption word audiotizer 16 that further processes the text to generate a form of the text capable of comparison to the audio signal or a comparative form of the audio signal, also referred to in some forms as an audio equivalent, as discussed below. As with other processing elements, the audiotizer may be a separate processing element, a functional portion of the television processor, the close caption analyzer or audio stream analyzer. It is shown separately to better illustrate the functional components of the FIG. 1 embodiment of the invention.

The audio stream analyzer 14 is configured to receive an audio stream, such as the audio portion of an analog or digital television signal. The audio stream analyzer 14 may include an analog-to-digital conversion element in order to digitize the audio stream, if it is not already in a digital format. The audio stream analyzer is configured to process various algorithms, discussed in more detail below, for comparing the digitized audio stream with the objectionable word list identified by the closed caption analyzer, and control the playback of the objectionable words in the audio stream. In some implementations, controlling playback comprises muting the objectionable words. Muting may be achieved by defining a modified audio stream where the audio signal for objectionable words is blanked or the amplitude or magnitude otherwise attenuated, identifying objectionable words with muting commands embedded in the audio stream that subsequent processing elements read and thereby mute the objectionable audio, and issuing mute commands synchronized with the audio presentation so as to not include an audible version of the objectionable word. The following discussion describes various ways that the closed caption analyzer and audio stream analyzer function in conjunction to control playback of an audio signal objectionable words. It is possible that the closed caption analyzer 12 and audio stream analyzer may be coded in the same processor, in separate processors, or may be defined in various hardware configurations.

Figure 2:
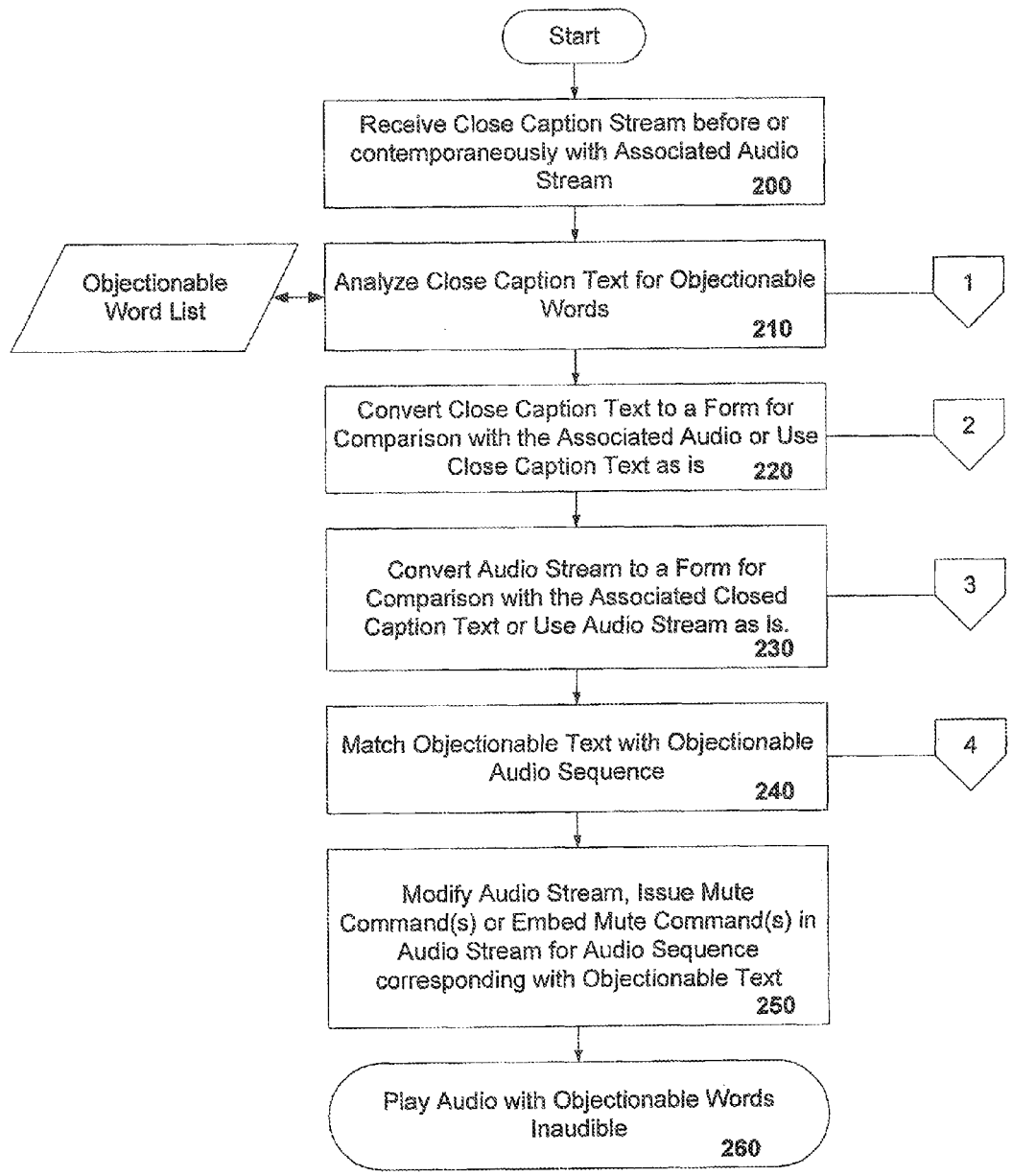
FIG. 2 is a flowchart illustrating one method for controlling playback of an audio signal by monitoring a corresponding close caption signal for specified text and then identifying a portion of the audio signal corresponding to the specified text conforming to the present invention.

FIG. 2 is a flowchart illustrating one method of controlling play of an audio presentation, such as to mute objectionable words, in accordance with the present invention. As mentioned above, the closed caption analyzer receives the closed caption stream from an audio presentation (operation 200), which may be a standard analog television signal including the closed captioning in line 21 of the vertical blanking interval. In one embodiment of the present invention, the closed captioning stream is received before or contemporaneously with the associated audio stream. Next, the closed caption analyzer searches the closed caption stream for a list of objectionable words (operation 210). The objectionable words are identified by the user/viewer and stored in a memory that is in communication with the closed caption analyzer. Upon identifying an objectionable word in the closed caption text, the closed caption analyzer transmits the objectionable word and the word preceding the objectionable word to the audio stream analyzer. For example, in the film "Gone With The Wind" Clark Gable said to Vivian Leigh "Frankly Scarlett, I don't give a damn." If the user indicates that the word "damn" is objectionable, then the word "damn" is stored in the objectionable word list. When the closed captioning signal for the above recited quotation is received by the closed captioning analyzer, it will identify the word "damn" as being objectionable to the current user, and will transmit the word "damn" as well as the preceding word "a" to the audio stream analyzer.

To property compare the objectionable words (in text form, initially) with the audio stream, the objectionable text and predecessor text are converted to a form for comparison to the audio signal (operation 220). In one implementation, in the audiotizer, the predecessor text and objectionable text are processed with a letter-to-sound algorithm that converts the text to a phonetic representation. The phonetic representation is subsequently characterized by an average or typical duration of the text and a representation of the typical total energy and specific energies in various frequency bands for the word so as to provide an audio equivalent of the text. At the same time as the closed captioning text is being processed or preferably subsequent to the processing of the closed captioning text, the audio stream is also processed into form for comparison (operation 230). In one example discussed below, the audio stream is processed to determine the total energy and particular energies of particular frequency bands for discrete time intervals of the audio stream. The closed captioning text processing and audio stream processing present the closed caption text and the audio stream in a format that is subject to comparison.

Once the objectionable and predecessor text and audio stream are represented in similar formats, the objectionable words in the audio stream may be identified (operation 240). As such, the objectionable text is matched with a particular audio sequence in the audio stream. When a match is identified between the objectionable text and the preceding text with the audio stream, mute commands or other mute processing occurs so that the audio stream and the associated television processor mutes the objectionable audio (operation 250). Thus, the method described with respect to FIG. 2, allows a television or other audio or audio/visual device, to play an audio sequence with objectionable words, phrases, or audio generally muted. As used herein, the term "mute" is meant to refer to a condition where the volume of an audio sequence has been reduced, but not necessarily reduced to zero. In some embodiments of the present invention, a muted word or phrase in an audio sequence will be audible, but the volume of the muted word will be less than adjacent words.

Figure 3:
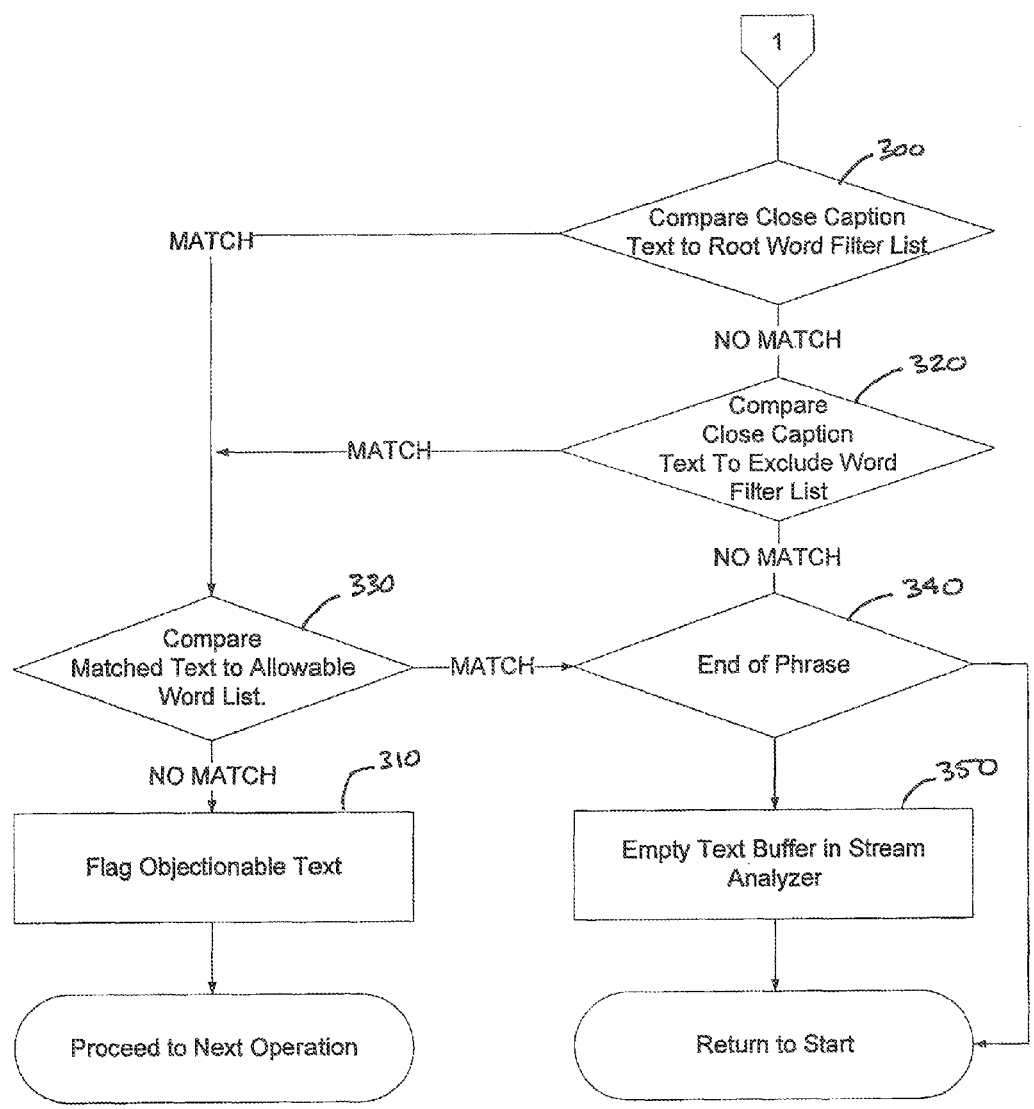
FIG. 3 is a flowchart illustrating one method for monitoring the close caption signal to determine if it contains the specified text conforming to the present invention.

FIG. 3 is a flowchart illustrating one particular method for analyzing the closed caption text to ascertain whether it includes words or phrases identified by the user as objectionable. In one particular implementation of the present invention, in the objectionable word selection process, the user may select particular words to exclude from the audio presentation as well as root words to exclude from the audio presentation. Objectionable root words are stored in a root word filter list. "Root words" generally refers to certain objectionable words, such as "damn", that may be a root word in a host of objectionable words and phrases, such as "damnit" and "damnit." With the root word filter list, any word including the root word would be filtered and removed from the audio portion of the presentation. Complete objectionable words are stored in an exclude word list.

A user may select objectionable words through a variety of mechanisms. In one implementation, an onscreen selection menu is displayed on a screen, e.g., a television monitor. The menu includes numerous potentially objectionable words and phrases that a user may select, alone or in combination, using a remote control adapted to communicate with the onscreen menu. The menu may also include objectionable word groupings and levels.

Referring to FIG. 3, the close caption analyzer compares the closed captioning text stream to the root word (operation 300). The comparison may be performed serially, on a word-by-word basis, as each is received. The comparison may also be performed on a close caption stream segment-by-segment basis. The beginning and end of close captioning text include markers that indicate when to display a close caption segment. Embodiments of the invention may also be configured to analyze segments of text occurring between the markers. If text in the close captioning stream includes an objectionable root word, then the text including the root word is flagged as objectionable along with the preceding word. Next, the closed captioning stream is compared to the exclude word filter list (operation 310). Any objectionable text and the preceding text is flagged. As will be discussed in greater detail below, the text preceding the objectionable text may be used to identify the start of a mute (i.e., the end of audio sequence for the word preceding an objectionable word may be the start of a mute). Besides flagging, it is also possible to load the preceding word, then the objectionable word into a first-in-first-out (FIFO) buffer. The preceding word then objectionable word are then processed in FIFO order to a form for comparison. When a match is made to the audio, with the preceding text, it is discarded. Then, when a match is made to the objectionable text, it is discarded. Thus, the operations occur in a FIFO order from identification of the word in the close caption to muting of the audio due to the sequential temporal relationship between the close caption and the associated audio.

In some implementations, objectionable text, whether from the root word or exclude word list, is further analyzed to determine whether it is in fact a word that is allowable or objectionable depending on the context of its use (operation 330). For example, the word "bitch" might be allowable if used in the context of a discussion concerning a dog, but not otherwise. To determine if it is allowable, in one implementation a comparison is made to all of the other words in the close caption phrase to attempt to ascertain the context of the word use. So, for example, if the word "dog" is mentioned in the same phrase, then the word would be allowed and not identified as objectionable. Other methods are shown and described in U.S. provisional patent application No. 60/481,548 titled "Parental Control Filter Settings Based on Information Associated with the Media Content" filed on Oct. 23, 2004, which is hereby incorporated by reference herein.

If there are no matches, then the processor determines if the end of closed captioning stream has been detected (operation 340). As mentioned above, a closed captioning stream typically includes an indicator for the beginning of a closed caption segment and the end of a closed caption segment. In the example set forth above, a closed captioning segment may include the phrase "Frankly Scarlett, I don't give a damn." The closed captioning text for that audio segment would include an indicator preceding the word "Frankly" and an indicator following the word "damn". If the end of phrase is detected, then the text buffer and stream muted analyzer is emptied, provided the objectionable word has been from the audio presentation. In a word-by-word FIFO arrangement, operation 340 is not implemented. If the end of phrase is not detected, then the following word is analyzed against the root word list and the exclude word list as recited above.

Figure 4:
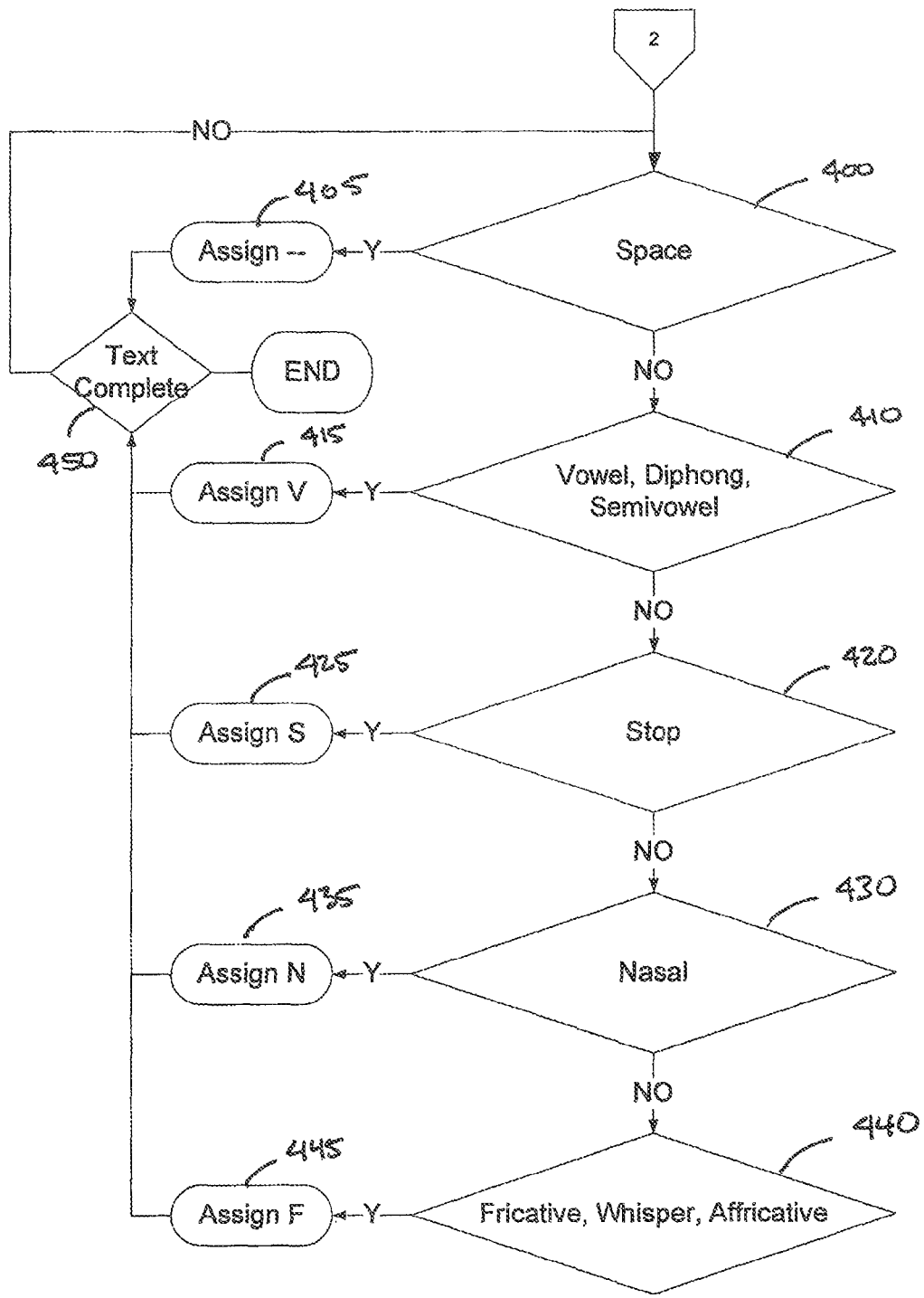
FIG. 4 is a flowchart illustrating one method of applying a letter-to-sound algorithm to text of the close caption stream to define a phonetic representation of the text conforming to the present invention.

FIG. 4 is a flowchart illustrating one implementation of the present invention wherein objectionable closed captioning text and the preceding text is converted to a phonetic representation, as part of the process of providing the objectionable text, on a letter-by-letter basis, as an audio equivalent. In the particular example of the flowchart of FIG. 4, a letter-to-sound algorithm is employed to convert a textual representation of the preceding text and objectionable text to a phonetic representation. Numerous letter-to-sound algorithms are available. In one example, the phonetic representation is broken down into five primary categories, including a category for spaces; a category for vowels, diphthongs, and semi-vowels; a category for stops; a category for nasals; and, a category for fricatives, whispers, and affricatives.

In the first operation, the text is analyzed to determine if it includes a space (operation 400). A space can be determined by extended silence or lack of properties associated with speech. If the letter-to-sound algorithm determines the text includes a space, then it is assigned a "-" (operation 405). Next, the text is analyzed to determine whether it includes a vowel, diphthong, or semi-vowel (operation 410). Typically, vowels, diphthongs and semi-vowels are characterized by high energy levels in low frequencies. An example includes the vowels a, e, o, u, and letter combinations such as "ou," "ow," "oi," as well as semi-vowels w, l, r, and y. Further, vowels, diphthongs and semi-vowels may be split into higher frequency vowels, such as "ee" found in the word "beet" as well as low frequency vowels like "oo" in the word "boot". If the letter-to-sound algorithm determines the letters of a word include a vowel, then it is assigned a "V" (operation 415). Next, the predecessor text or objectionable text is analyzed to determine whether it includes a stop (operation 420). A stop is characterized by a short period during which the mouth is entirely closed followed by a burst of sound. In one example, unvoiced stops such as p, t, and k are distinguished from voiced stops, such as b, d, and g. If the letter-to-sound algorithm determines the letters of a word include a stop, then it is assigned an "S" (operation 425). Next, the predecessor text or objectionable text is analyzed to determine whether it includes a nasal sound (operation 430). The nasal sound is typically characterized with a lower frequency sound coming from the nasal cavity rather than the mouth, such as in the pronunciation of m, n, and ng. If the letter-to-sound algorithm determines the text includes a nasal, then it is assigned an "N" (operation 435). Finally, the predecessor text or objectionable text, is analyzed to determine whether it includes a fricative, whisper, or affricative. Fricatives, whispers, and affricatives are characterized by energy concentrated in higher frequencies and are produced by the forcing of breath through a constricted passage, such as in the sound associated with the letters v, ph, z, zh (as in "azure"), f, s, sh, j, ch, and h. If the letter-to-sound algorithm determines the text includes a fricative, whisper, or affricative, then it will be assigned an "F" (operation 445). Each word is fully characterized; thus, in operation 450, the algorithm determines if the word is complete. If not, the analysis continues beginning with the first operation 400.

Analyzing predecessor text and objectionable text through a letter-to-sound algorithm assigns a phrase or word to one of the above identifiers, i.e., -, V, S, N, and F. As such, the phrase "Frankly Scarlett, I don't give a damn" is converted to a string of symbols. The predecessor word "a" would include the identifier "V" followed by the space identifier and then the word damn is identified by the symbols S, V, and N, with S representing a stop for the letter "d", V representing the vowel "a", and N representing the nasal letters "mn".

Figure 5:
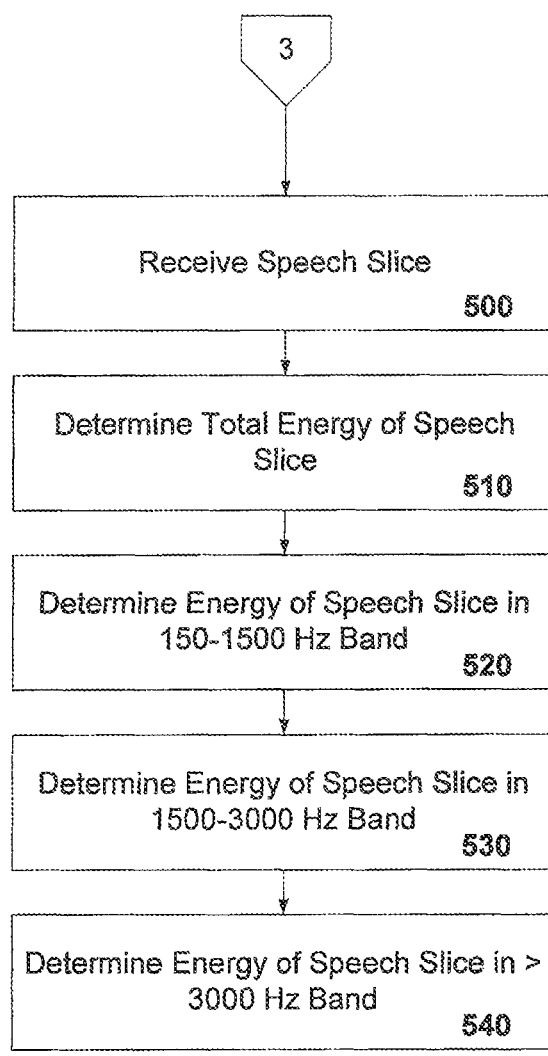
FIG. 5 is flowchart illustrating one method of analyzing a temporal segment of an audio signal to assign energy values conforming to the present invention.

FIG. 5 is a flowchart illustrating one method of analyzing or processing the audio signal in preparation for comparison against the comparable form of the objectionable text identified from the closed captioning signal. First, the audio stream analyzer receives the digitized audio signal and segments the audio signal into a series of 20 millisecond portions (operation 500). Each 20 millisecond portion of the analog or digitized time signal is hereinafter referred to as a "speech slice". The audio stream analyzer computes the total energy for each speech slice (operation 510). In one example, the total energy of the time slice is the sum of the square of the amplitudes normalized by a long-time energy average to normalize for average signal strength. Additionally, the energy of various frequency bands of the speech slice is further determined (operations 520-540). In one example, the audio analyzer determines the energy of the speech slice in the 150-1500 Hz frequency band (operation 520), the 1500-3000 Hz frequency band (operation 530), and the frequency band above 3000 Hz (operation 540). In one example, each energy band measurement is normalized to be a percentage of total energy. Such energy determinations may be achieved through digital filtering, such as with a Fast Fourier Transform, followed by a summation to determine the frequency bands. Alternatively, a cepstral coefficient approach, instead of band energy, may be employed.

Determining the total energy and frequency band energies provides four distinct features that capture sufficient information to distinguish the categories of speech sounds (i.e., -, V, S, N and F) defined with respect to the closed captioning text. It will be recognized that a speech sound is not a single 4-number representation of the energies, but a series of 4-number energy representations for each time slice over a time interval containing the sound.

Figure 6:
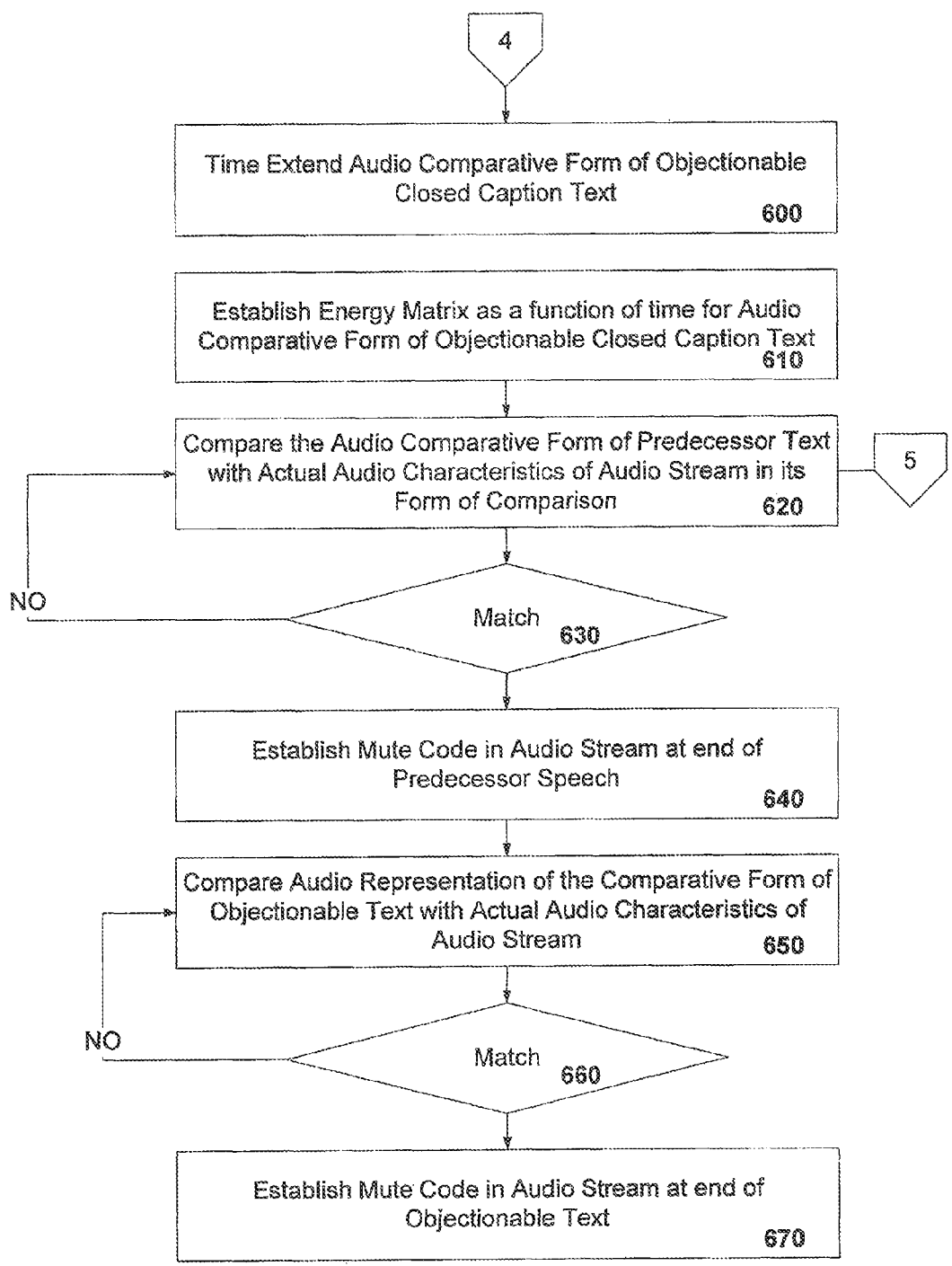
FIG. 6 is a flowchart illustrating one method of comparing a comparative form of the text of the close caption signal to a comparative form of the audio signal in order to control playback of the audio signal, such as through muting some portion of the audio signal, conforming to the present invention.

FIG. 6 is a flowchart illustrating one method of comparing the comparative form of the predecessor text and objectionable text with the comparative form of the audio stream to determine when a mute should occur. In order to properly compare the text with the audio signal, the text may be further processed to extend the phonetic symbol representation(s) of the text to the average duration of the sound type, and further associated with the proper energy characteristics of the sound. As mentioned above, the audio signal is broken down into 20 millisecond time slices, and each 20 millisecond time slice is characterized by total energy and energy in three particular frequency bands. As such, the audio signal is characterized broadly by time and energy. Thus, the phonetic representation of the predecessor text and objectionable text is further characterized by time and energy for purposes of comparing to the audio signal.

First, the phonetic representation of the precursor text and objectionable text is time extended to be associated with the average duration of the sound type (operation 600). The average duration of each type of sound may be determined through experimentation. For example, if a vowel sound averages 160 milliseconds, it is repeated over eight 20 millisecond time slices. In the time extending operation, each symbol is extended over the average duration for that symbol. As such, a vowel is extended 160 milliseconds. So, for example, the "a" in "damn" phonetically represented as a "V" would be extended for 160 milliseconds.

In addition to the time length for each phonetic representation, each phonetic representation is also associated with a total energy value, and energy values in the same frequency bands as the audio signal (i.e., 150-1500 Hz, 1500-3000 Hz, and above 3000 Hz) (operation 610). In one example, for each phonetic symbol, a matrix of typical energy values are provided over a given time interval. Thus, for example, for a vowel sound averaging 160 milliseconds, an energy matrix is provided for energy values over the 160 millisecond range. The matrix or "template" may be developed for each phonetic symbol through experimentation of different pronunciations of the various symbols and letters presented in the phonetic symbols. As such, the matrix may include many different sound representations for each phonetic symbol. Matrixing techniques are shown and described in "Cluster Analysis and Unsupervised Learning," by Meisel, *Computer-Oriented Approaches to Pattern Recognition*, Academic Press, 1972, which is hereby incorporated by reference herein.

When the closed caption text is in its comparative form, it is compared with the comparative form of the audio stream (with energy values) (operation 620). If there is a match (operation 630), then a mute code or command is set in the audio stream following the end of the predecessor text (operation 630). Muting upon the indication of a matched predecessor text may be achieved in three different configurations of the present invention. In one configuration, the audio analyzer issues a mute command contemporaneously with the detection of the end of the predecessor text. The mute command causes the audio to be momentarily muted. If the command has a certain latency as compared to the audio stream, then various latency mechanisms may be employed to delay the command sufficiently so that it is synchronized with the actual play of the audio stream. In another configuration, the audio stream is modified so that audio data following the end of the predecessor speech is blanked or attenuated. The blanking or attenuation continues until the detection of the end of the objectionable text. Finally, in a third alternative, a digital command may be inserted into the audio stream between the predecessor text and the objectionable text. Upon detection of the mute command in the audio stream, the audio will be momentarily muted in accordance with the command code inserted into the digitized audio stream.

After the predecessor text comparison, the audio comparison form of the objectionable text is compared with the comparison form of the audio stream (operation 650). Upon detection of a match (operation 660), a second mute code or command is issued at the end of the objectionable language (operation 670). In an embodiment that issues a command to mute the audio, at the end of the objectionable language, a command is issued to once again play the audio at its normal volume, i.e., disable the mute. In an embodiment where the digitized audio stream is attenuated or blanked, upon detection of the end of the objectionable word, the blanking or attenuation operation is discontinued and the audio stream is no longer modified. Finally, in embodiments employing an integrated command within the digitized audio stream, a subsequent un-mute command may be inserted into the audio stream at a location following the end of the objectionable word.

Figure 7:
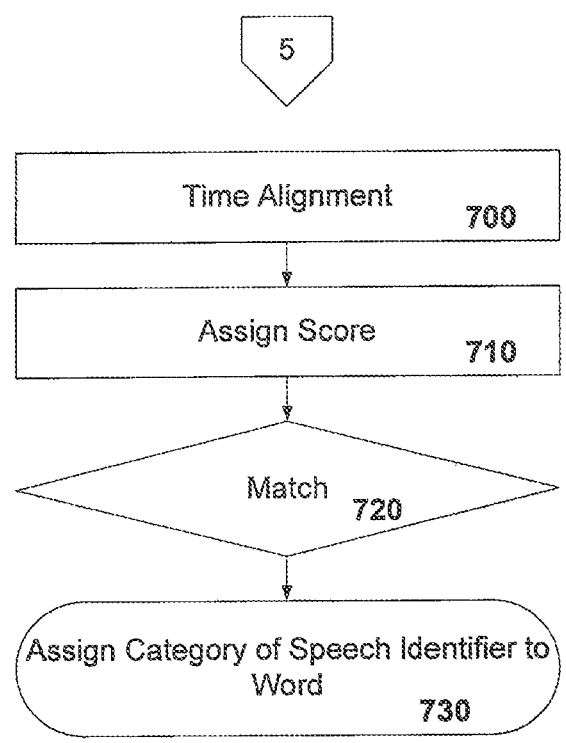
FIG. 7 is a flowchart illustrating one method of comparing a comparative form of the text of the close caption signal to a comparative form of the audio signal conforming to the present invention.

FIG. 7 is a flowchart illustrating one method of comparing the comparative form of the text whether predecessor or objectionable, with the comparative form of the audio stream. The first operation involves a time alignment between the comparative form of the text (the "predicted signal") and the comparative form of the audio signal (the "observed signal") (operation 700). In one particular implementation, time alignment is achieved through a widely recognized template matching speech recognition system referred to generally as dynamic time-warping.

FIG. 8 illustrates one example of a time alignment between the observed signal and predicted signal based upon a dynamic time-warping algorithm. The predicted signal is generated in accordance with a method described herein of FIG. 4, and operations 600 and 610 of FIG. 6. The observed signal is generated in accordance with the method described herein with regard to FIG. 5. As discussed above, the observed signal is a series of four-dimensional vectors involving the total energy and the energy of the 150-1500 Hz frequency band, the 15003000 Hz frequency band, and the greater than 3000 Hz frequency band. Further, each of the four-dimensional vectors comprises a 20 millisecond slice. In the example of FIG. 8, there are fourteen 20 millisecond time slices and associated four-dimensional vectors (x1-x14). The dynamic time-warping algorithm finds the best match of the sequence of the predicted signal (-FFFWV-VVVVVVNN) to the observed signal through the use of a "score" to measure the match between the predicted values and the observed values, using the total score to decide the best way of matching. The dynamic time-warping algorithm also takes into account a desire not to "stretch" one predicted value over too many actual values or vice versa. The result might be a best assignment that matches predicted to actual value intervals as above. If so, the algorithm predicts that the phrase being matched, e.g., the predecessor phrase, ends at observed signal slice X14, and muting should begin after that time slice, when matching predecessortext. Thus, during processing, when the end of the predecessor text is detected, muting is begun by any of the various methods discussed herein. If the audio does not match the speech reasonably, such as because of an error, rough transcription or excessive background noise, then the score will indicate a poor match and no action will be taken based on the score.

As part of the time alignment, a score is created through comparing the match of a single observed time segment (with four feature values) with a predicted time segment, characterized by one of the five phonetic categories, e.g., vowel (V). As noted in the previous section on converting text to an audio equivalent, one option is to have "typical" values of each feature, e.g., by averaging over typical examples of that category during the development phase. The score is then the best match of the typical values to the observed values. The match can be measured by a simple "distance" measure, the sum of the squared differences in each feature: in vector notation, $\|^x\text{observed}-^x\text{target}\|^2$, to give the square of the distance. If the match is exact, the score is zero. The best match is categorized by the lowest total score. A variation is to weight the features differently, e.g., to weight total energy more than the energy in each frequency band, if this improves performance. If there is more than one typical example (template) for each category of speech, as previously suggested, the score is a minimum over all templates in the category:

$$\text{Min}_i [\|^x\text{observed}-^x\text{target-i}\|]^2.$$

In summary, with a choice of scoring function and an algorithm such as dynamic time warping to use the scoring function, the algorithm for determining when the phrase ends is specified.

An alternative embodiment of the present invention does not involve analysis of the close caption signal. Rather, the audio signal is received and stored in a memory. The stored audio signal is then processed with a speech recognition algorithm. Such a speech recognition algorithm may take into account amplitude, frequency, wavelength, and numerous other factors in analyzing the audio signal. Each word, phrase, etc. identified by the speech recognition algorithm is compared to the objectionable words identified by the user, and/or the objectionable root words identified by the user. The matched audio sequence is directly attenuated in memory through manipulate of the stored signal segment, or a mute code embedded in the stored signal.

In the event the audio signal includes spoken words and other sounds, i.e., background noise, music, ambient noise, etc., then various filtering techniques may be employed to separate the spoken words from the other sounds. Additionally, for multiple track audio signals, e.g., a center channel, front channels, rear channels, etc., then each audio track may be separately analyzed. Typically, the center channel includes much or all of the spoken words in a multichannel audio signal. As such, it may be sufficient to analyze only the center channel.

The embodiments of the present invention may comprise a special purpose or general purpose computer including various computer hardware, a television system, an audio system, and/or combinations of the foregoing. These embodiments are discussed in detail above. However, in all cases, the described embodiments should be viewed as exemplary of the present invention rather than as limiting its scope.

Embodiments within the scope of the present invention also include computer-readable media for carrying or having computer-executable instructions or data structures stored thereon. Such computer-readable media may be any available media that can be accessed by a general purpose or special purpose computer such as the processing elements of a television, set top box, etc. By way of example, and not limitation, such computer-readable media can comprise RAM, ROM, EEPROM, CD-ROM, DVD, or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the associated discussion is intended to provide a brief, general description of a suitable computing environment in which the invention may be implemented. Although not required, the invention is described in the general context of computer-executable instructions, such as program modules being executed by one or more processing elements, such as a television processor. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps. Furthermore, program code means being executed by a processing unit provides one example of a processor means.

What is claimed is:

1. A method of controlling an audio presentation, the method comprising:
receiving an audio signal by at least one processor;
storing the audio signal in a memory, the memory in communication with the at least one processor;
receiving a filter list including at least one word;
the at least one processor identifying a portion of the audio signal corresponding to the at least one word based on a match between a comparative form of the audio signal and an audio representation of the at least one word, the comparative form of the audio signal being generated based on at least one energy representation of the audio signal, the at least one energy representation includes a-series of vectors of energy involving a total energy of a speech slice and an energy of one or more-frequency bands of the speech slice; and
the at least one processor manipulating the portion of the audio signal in the memory to filter the at least one word during the audio presentation by embedding a control code in the audio signal stored in the memory wherein the control code is adapted to attenuate the portion of the audio signal.

2. The method of claim 1, wherein the audio representation of the at least one word is generated based on at least one energy value for a phonetic representation of the at least one word.

3. The method of claim 1, wherein the control code is adapted to mute the portion of the audio signal.

* * * * *